No. 834,926. PATENTED NOV. 6, 1906.
E. McGARVEY.
VIBRO METER.
APPLICATION FILED JUNE 24, 1905.

Witnesses:
E. R. Rodd.
Chas. S. Ripley

Inventor:
Edward McGarvey
by C. M. Clarke
his attorney

UNITED STATES PATENT OFFICE.

EDWARD McGARVEY, OF YOUNGSTOWN, OHIO.

VIBRO-METER.

No. 834,926.  Specification of Letters Patent.  Patented Nov. 6, 1906.

Application filed June 24, 1905. Serial No. 266,836.

*To all whom it may concern:*

Be it known that I, EDWARD MCGARVEY, a citizen of the United States, residing at Youngstown, in the county of Mahoning and State of Ohio, have invented certain new and useful Improvements in Vibro-Meters, of which the following is a specification, reference being had therein to the accompanying drawings, forming part of the specification, in which—

Figure 2:
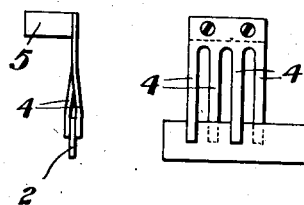
Figure 1:
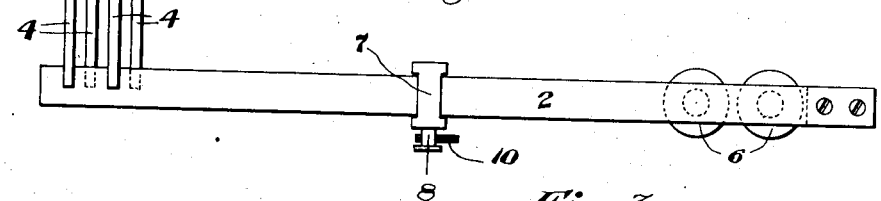
Figure 3:
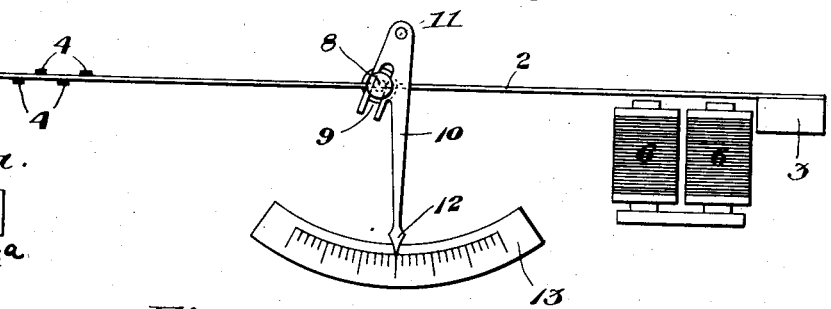
Figure 3A:
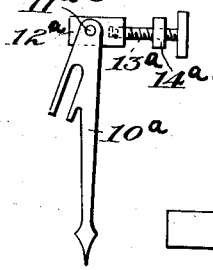
Figure 4:
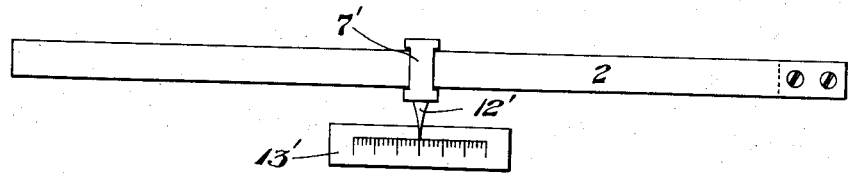
Figure 5:
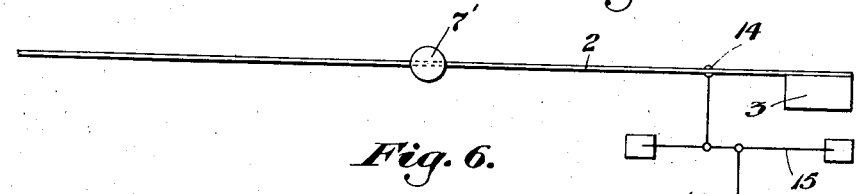
Figure 6:
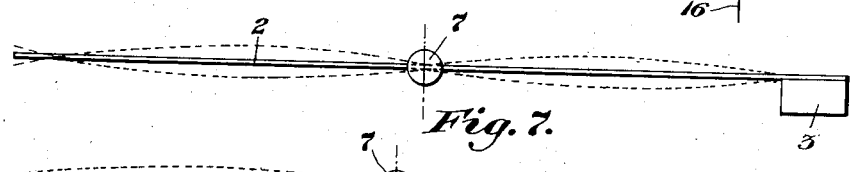
Figure 7:
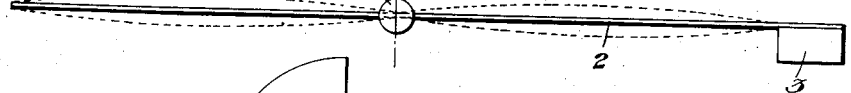
Figure 8:
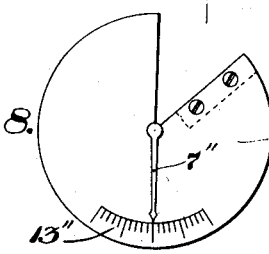

Figure 1 is a plan view of my improved vibro-meter, showing the indicating-arm in section. Fig. 2 is an end view of the device, showing the retaining-spring in engagement with the vibratory ribbon. Fig. 3 is a front elevation of the device shown in Fig. 1. Fig. 3ª is a detail view showing adjusting mechanism for the indicating-arm. Fig. 4 is a view similar to Fig. 1, showing a modified construction. Fig. 5 is a diagrammatic view illustrating means for imparting vibrations to the ribbon mechanically. Figs. 6 and 7 are similar views showing the rider in varying positions resulting from different rates of vibration. Fig. 8 shows a disk supported along one cut-out edge and provided with a radially-arranged rider.

My invention refers to improvements in frequency or vibration meters for indicating directly on a scale the frequency of an alternating circuit or the rate of vibration of any active mechanical element or for indicating variations in pressure. The principle of the invention is based on the laws of vibratory motion.

Electricians, and particularly those in charge of alternating-current stations, have long recognized the need for an instrument which would indicate the frequency of the circuit accurately within one alternation. The reasons for this are, first, on account of the proper speeding of the generator; this is essential from the fact that a system will work most satisfactorily and efficiently when running at the rate of alternation for which the system was designed, and more particularly so when the current is supplied to motors and other apparatus having coils which comprise an inductive resistance; second, where A. C. generators are desired to run in parallel it results in a saving of time to have an instrument which will indicate the frequency accurately over a sufficient range, so that the generators can be brought into step without resorting to the slow method connected with synchronizing lamps.

It is a well-recognized fact and fundamental in the first principles of vibratory motion that any vibrating element, as a disk or reed, when supported at one point and vibrated by means of an electromagnet in circuit with a source of alternating or intermittent current or mechanically in any convenient manner, as by means of a violin-bow applied to its edge, will vibrate at the rate depending upon its material, size, or dimensions. If upon such a vibrating element sand or other light material is placed and vibration imparted to the element, such loose material will collect at certain points and will arrange itself into lines or accumulations indicating the nodes or non-vibrating points of quietness. This is due to the tendency of a body vibrating freely upon itself to force any movable object supported thereon from the point of greatest movement at the center of the vibrating zone toward the node or neutral point at which obtains the least motion.

My invention is designed to utilize this principle in physics and is constructed and designed to operate in the manner hereinafter described and as shown in the accompanying drawings, employing a longitudinal ribbon of steel or other suitable metal or other equivalent vibrating element, as a disk, provided with a movable rider adapted to transmit motion to an indicating-arm arranged in proper relation with a suitable dial or to indicate directly upon such a dial or scale.

Referring to the drawings, 2 indicates the ribbon, rigidly secured at one end to any suitable support, as a post 3, the other end of the ribbon being engaged and supported by any suitable flexible means adapted to co-operate with the vibrating ribbon without materially affecting its operation, as spring-blades 4. These blades are rigidly secured to any suitable support, as a post or abutment 5, and embrace the ribbon at each side, lightly holding it with sufficient necessary resiliency.

6 is a magnet located adjacent to the rigid support of the ribbon and in suitable relation therewith, so as to vibrate it at varying rates of vibration, dependent upon the rate of interruption or condition of flow of the current.

7 is a movable element, which I call a

"rider," loosely mounted upon the ribbon 2, and which is arranged to traverse the ribbon longitudinally and to assume a position corresponding with the node of vibration, as indicated in Figs. 6 and 7.

In Figs. 1 and 2 I have shown the rider as provided with a projecting lug or pin 8, engaging a slot 9, formed in an indicating-arm 10, pivoted at 11 and provided with a terminal indicating-point 12, arranged to traverse the arc-shaped dial 13 and to indicate readings thereon, subject to and dependent upon the varying positions of the rider upon the ribbon. That portion of the arm 10 in which the slot 9 is formed is arranged at such an angle to the longitudinal axis of the arm 10 as to counteract the effect, to a certain extent, of the differences in movement produced by rates of vibration caused by that property of vibrating members wherein, as the vibration gets lower in rate and the segment consequently longer, a greater movement of the node will occur for the given change in the rate of vibration. The pivotal bearing 11 may be either fixed or made adjustable to allow of setting of the pivotal bearing with relation to the normal position of the rider In Fig. 3ª I have illustrated one manner in which the indicating-arm 10ª may be adjusted, the pivotal bearing 11ª extending from a movable block 12ª and adapted to be delicately adjusted by means of a threaded screw 13ª, mounted in a suitable threaded bearing 14ª. If desired, the adjustment may be vertical as well as lateral.

The ribbon 2 is made of such material, weight, and thickness that when influenced by rates of vibration imparted to it at one end by suitable means, as an electromagnet, and ranging between the limits of vibration over which the instrument is constructed to indicate, it will have a resulting node bounding the first fundamental and will take a position between the two end supports. For example, let an alternating current traverse the coils of the magnet having a frequency of one hundred and twenty alternations per second, the magnet will force upon the ribbon a rate of vibration of one hundred and twenty periods per second. In order for the ribbon to vibrate to its greatest amplitude, the segment opposite the magnet and having the fixed node at one end where the ribbon is fixed to the post must adjust itself to the rate of vibration by changing in length and forcing the end segment, supported in a yielding manner, to its rate of vibration. The rider, which moves between certain limits, will, from the action of the ribbon, move toward the node and will come to rest at the point of least vibration, and if the scale is suitably graduated and adjusted will indicate the rate of vibration as one hundred and twenty per second. Any change in the rate of alternation in the circuit will produce a corresponding change in the position of the node and a consequent movement of the rider.

The rider is designed to act as a visual indicator of the node, and in Fig. 4 I have indicated a simpler construction, wherein the rider 7' itself is provided with an indicating-point 12', arranged to play along and indicate readings upon a dial or scale 13', made of sufficient length to accommodate the longest range of movement of the node.

In Fig. 5 the ribbon 2 is shown as connected at 14 with an arm forming a portion of or connected with a diaphragm 15, with which is connected a vibrating element 16, adapted to transmit vibrations to the diaphragm from any active element, as a shaft, the rate of which it is desired to measure.

In Fig. 8 the rider 7'' is made in the form of an indicating-hand, loosely mounted at the center of a disk 2', cut out in segmental form and supported upon a rigidly-connected abutment. By this arrangement the nodes will assume radial lines, which will be indicated by the freely-mounted rider 7'', a suitable scale 13'' being arranged in the path of travel of the indicating-pointer.

Various adaptations of the invention may be made by the skilled mechanic or electrician. It may be changed, varied, or modified to suit various adaptations of use or local conditions, and I do not desire to be limited to the exact construction shown and described, but to include within the scope of the claims all such changes and variations.

What I claim is—

1. A vibro-meter consisting of a vibrating element provided with an indicating-rider capable of conforming to the node of vibration of the element, substantially as set forth.

2. A vibro-meter consisting of a vibrating element provided with an indicating-rider capable of conforming to the node of vibration of the element, with means for imparting vibrations to the vibratory element, substantially as set forth.

3. A vibro-meter consisting of a ribbon rigidly secured at one end and provided with a variable support at the other end, and having a movable rider arranged to adapt itself to the node of vibration, substantially as set forth.

4. A vibro-meter consisting of a ribbon rigidly secured at one end and provided with a variable support at the other end, a movable rider arranged to adapt itself to the node of vibration, and means for imparting vibration to the ribbon, substantially as set forth.

5. A vibro-meter consisting of a ribbon rigidly secured at one end and provided with a variable support at the other end, a movable rider arranged to adapt itself to the node of vibration, and an electromagnet located in proximity to the ribbon adjacent to its point of rigid support, substantially as set forth.

6. A vibro-meter comprising a vibrating element rigidly supported at one terminal, a movable rider mounted thereon, and an indicating-arm in operative engagement with said rider, substantially as set forth.

7. A vibro-meter comprising a vibrating element rigidly supported at one terminal, a movable rider mounted thereon, and provided with a projecting pin, and an indicating-arm pivoted at one end and provided with a slot engaging said pin, substantially as set forth.

8. A vibro-meter comprising a vibrating element rigidly supported at one terminal, a movable rider mounted thereon and provided with a projecting pin, an indicating-arm pivoted at one end and provided with a slot engaging said pin, and an indicating-scale arranged in operative relation with the point of said arm, substantially as set forth.

9. A vibro-meter comprising a vibrating element rigidly supported at one terminal, a movable rider mounted thereon and provided with a projecting pin, an indicating-arm pivoted at one end and provided with a slot engaging said pin, and an indicating-scale arranged in operative relation with the point of said arm, with means for imparting vibration to the ribbon, substantially as set forth.

10. A vibro-meter comprising a vibrating element rigidly supported at one terminal, a movable rider mounted thereon and provided with a projecting pin, an indicating-arm pivoted at one end and provided with a slot engaging said pin, and an indicating-scale arranged in operative relation with the point of said arm, with means for imparting vibration to the ribbon, and means for resiliently supporting the free terminal of the ribbon, substantially as set forth.

In testimony whereof I affix my signature in presence of two witnesses.

EDWARD McGARVEY.

Witnesses:
 CHAS. S. LEPLEY,
 C. M. CLARKE.